April 14, 1942.　　J. B. BURNS ET AL　　2,279,442
COLLAPSIBLE BOTTLE HOLDER
Filed March 11, 1941
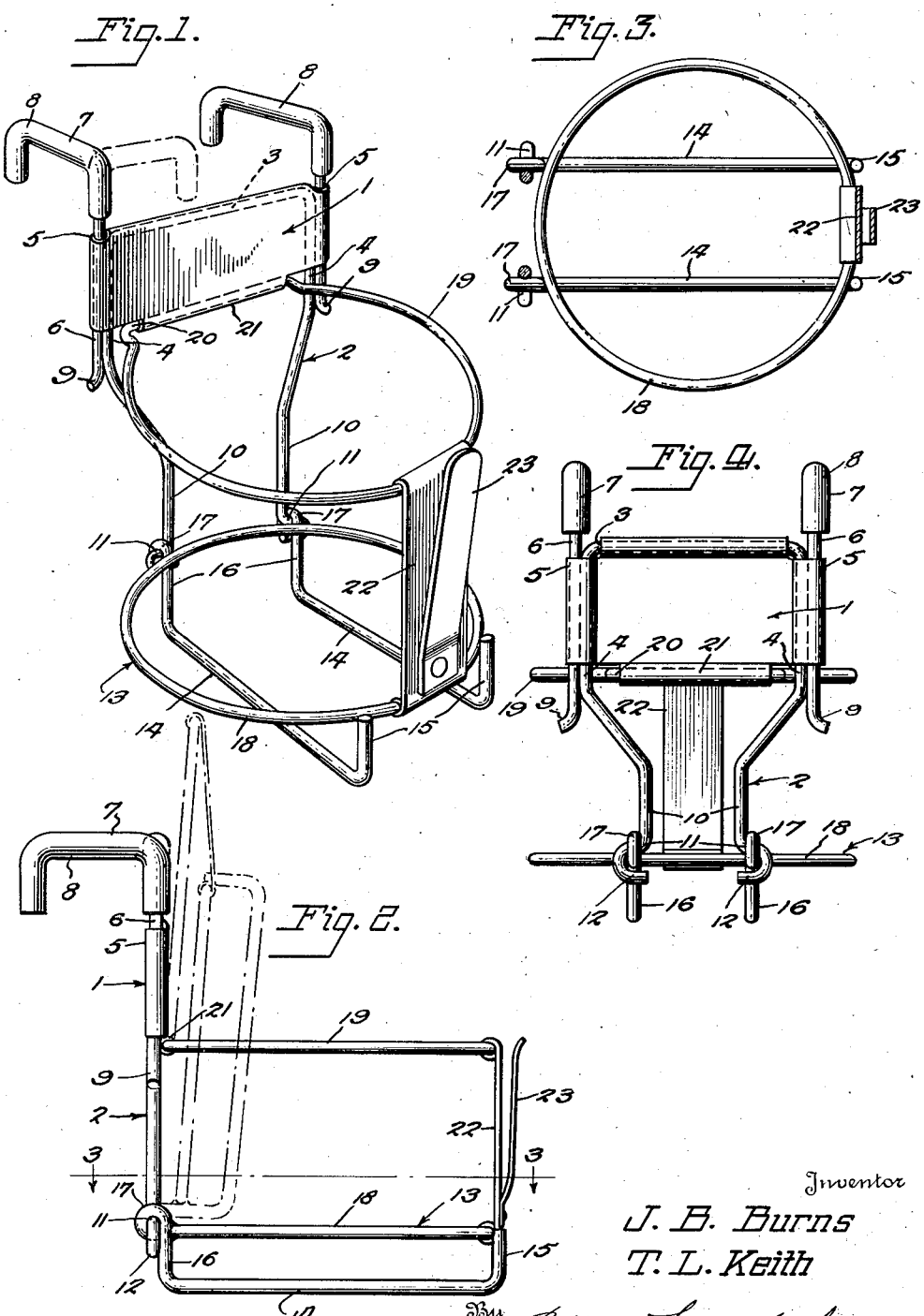
Inventor
J. B. Burns
T. L. Keith
By Mason Fenwick & Lawrence
Attorneys Patented Apr. 14, 1942

2,279,442

UNITED STATES PATENT OFFICE 2,279,442

COLLAPSIBLE BOTTLE HOLDER

James B. Burns and Thomas L. Keith, Atlanta, Ga.

Application March 11, 1941, Serial No. 382,800

4 Claims. (Cl. 248—311)

This invention relates to a collapsible bottle holder particularly designed for use in an automobile as adjunctive to curb service.

One of the objects of the invention is to provide a bottle holder which when in collapsed position folds substantially flat, so that it or a number of them, can be conveniently stowed in the glove compartment of the automobile, and which when expanded is adapted to be hooked over the window sill in position to receive and support a bottle in upright position.

Other objects of the invention will appear as the following description of a preferred and practical embodiment thereof proceeds.

In the drawing which accompanies and forms a part of the following specification, and throughout the several figures of which the same characters of reference have been employed to designate identical parts:

Figure 1 is a perspective view of the device in expanded position;

Figure 2 is a side elevation of the same also indicating it, in broken lines in collapsed position;

Figure 3 is a horizontal cross-section taken along the line 3—3 of Figure 2; and Figure 4 is a rear elevation.

Referring now in detail to the several figures, the bottle holder comprises a bracket plate 1, which is preferably of sheet metal and from which rigidly depends a bracket frame 2, preferably constituted by a wire loop having a flat bight portion 3 placed against the rear side of the bracket plate 1, the upper margin of said bracket plate being rolled over said bight portion, securing said frame to said bracket plate. The leg portions 4 of the frame 2 extend downwardly and preferably parallel to each other at the rear of the bracket plate, the side margins of which are turned backward so as to embrace said leg portions and secure the frame rigidly to said bracket plate. The turned side edges of said bracket plate also form hinge sleeves 5, receiving the vertical shanks 6 of the hooks 7. The upper portions of said hooks are so shaped as to adapt them to embrace the window sill of the automobile and they are preferably sheathed with tubular rubber members 8, which prevent the hooks from marring the window sill. The lower ends of the shanks 6 are preferably slightly bent, as indicated at 9, to prevent them from slipping out of the sleeves 5. The width of the bracket plate 1 is preferably such as to permit the hooks 7 to be turned inwardly into the plane of the bracket plate. The bracket plate serves as a convenient surface upon which advertising matter may be displayed.

Beneath the bracket plate the leg portions of the frame 2 are preferably brought inwardly so as to narrow said frame and the lower parts 10 of said leg portions extend parallel to one another and are then bent outwardly to form hinge axes 11 which lie in a common horizontal line. The ends of said leg portions are then in-bent to form the stops 12.

The bottle holder comprises a base cup which in general is designated by the reference character 13, and is constituted by a pair of parallel rods 14 having upwardly extending front and rear portions 15 and 16. The upwardly extending rear portions 16 terminate in eyes 17 which hingedly embrace the axes 11. A lower ring 18 is arranged in a horizontal plane and secured, as by spot welding, to the upwardly extending front and rear portions of the rods 14. The latter are spaced in such proximity as to form a support for the bottom of a bottle. When the base cup is in the extended position shown in Figures 1 and 2, the rear members 16 rest against the forward faces of the stops 12, so that the base cup is held at right angles to the bracket.

The bottle holder includes also the upper ring 19, the rear portion 20 of which is rectilinear and hingedly embraced within a sleeve 21 formed by the rolled lower margin of the bracket plate 1. The axes 11 and the axis of the hinge portion 21 of the ring 19, are of course, parallel. The front of the upper and lower rings 17 and 18 are hingedly connected to the opposite ends of a tie plate 22, the vertical length of said tie plate being equal to the vertical distance between the hinge connections of the upper ring and base cup with the bracket, so that the parts have the relationship of a folding parallelogram, permitting the upper and lower rings to be folded substantially into a common plane, as indicated in broken lines in Figure 2.

A light spring finger 23 may be secured at its lower end to the tie plate 22 with its free portion slightly divergent therefrom, thereby affording a receiver for a cigarette or light article which is held in place by the slightly resilient pressure of said spring finger.

It will be obvious from the above description that when the bottle holder is in collapsed position with the hooks 7 turned inwardly toward one another and in the common plane of the bracket plate 1, and with the upper and lower rings folded substantially into a common plane close to the bracket plate 1, the device occupies very little room, so that a number of them can be conveniently stored in the glove compartment of the automobile. When it is desired to use the bottle holder, the hooks may be turned to the position shown in Figure 1, and the cage constituted by the upper ring and base cup, together with the tie plate 22 may be unfolded to the position shown in Figure 1, and the device rested upon the sill of the automobile in readiness to receive the bottle.

While we have referred to the preferred use of the invention as being in connection with an auto vehicle, it is equally adaptable to be used in association with a desk or other similar article of furniture. For example, the hooks 7 may be placed over the edge of a desk drawer, and if the handle of the drawer is in the way, the hooks may be slightly canted either to the right or to the left, in order to make the bottle holder avoid the interference of the drawer handle.

It will be understood to those skilled in the art that while we have described the invention as being at least in part made of bent wire or rods, it may be exemplified in other forms without transcending the spirit and scope of the invention. It will also be understood that the device may be made of such dimensions as to hold bottles of various size, and that it is not necessarily confined to use with bottles, but may also hold cups, glasses or like receptacles.

What we claim as our invention is:

1. Collapsible bottle holder comprising a bracket, suspending hooks hinged on vertical axes at opposite sides of said bracket to swing into and out of the plane of the bracket, and a bottle receiver having upper and lower members independently hingedly connected to said bracket along spaced parallel axes and foldable substantially into the plane of said bracket.

2. Collapsible bottle holder comprising a vertically disposed bracket plate, suspending hooks hinged on vertical axes at opposite sides of said bracket plate to swing into and out of the plane of said plate, suspending legs depending from the bracket plate, and a bottle receiver having upper and lower ring shaped members independently hingedly connected at their rear sides one to said bracket and the other to said suspending legs along spaced parallel axes, and a link interconnecting said members at their front sides, the length of said link being equal to the distance between said axes.

3. Collapsible bottle holder comprising a bracket plate, sustaining hooks journaled in the ends of said plate on vertical axes, a bracket frame secured to said plate and depending therefrom comprising spaced leg members having aligned transversely bent portions constituting hinge axes, a base cup comprising a ring and spaced downwardly dished bottle supporting members bridging said ring and secured thereto, said base cup being hingedly secured to said axes in the plane of said ring, an upper bottle embracing ring journaled in a sleeve at the bottom of said bracket plate and a link hingedly connected at its ends to said upper and lower rings, the length of said link being equal to the distance between the hinge connections of said upper ring and base cup with said bracket plate and frame.

4. Collapsible bottle holder as claimed in claim 3, the leg portions of said frame being formed with stops engageable with said base cup to support it perpendicularly to said frame when in extended position.

JAMES B. BURNS.
THOMAS L. KEITH.